US006852803B2

(12) United States Patent
Ma

(10) Patent No.: US 6,852,803 B2
(45) Date of Patent: Feb. 8, 2005

(54) GRAFT COPOLYMER WITH A URETHANE/UREA GROUP AS A PIGMENT DISPERSANT

(75) Inventor: Sheau-Hwa Ma, West Chester, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 102 days.

(21) Appl. No.: 10/162,186

(22) Filed: Jun. 3, 2002

(65) Prior Publication Data

US 2003/0225207 A1 Dec. 4, 2003

(51) Int. Cl.$^7$ .................. C08F 291/12; C08F 290/04
(52) U.S. Cl. .................. 525/278; 525/279; 525/282; 525/327.6; 525/329.9; 525/331.3; 524/555; 524/556; 524/553; 524/558
(58) Field of Search .................. 525/278, 279, 525/282, 327.6, 329.9, 331.3; 524/555, 556, 553, 558

(56) References Cited

U.S. PATENT DOCUMENTS 5,852,123 A    12/1998    Huybrechts
6,037,414 A    3/2000    Simms et al.

OTHER PUBLICATIONS

Copy of International Search Report (PCT/US03/17256) dated Mar. 17, 2004.

*Primary Examiner*—James J. Seidleck
*Assistant Examiner*—Olga Asinovsky
(74) *Attorney, Agent, or Firm*—Steven C. Benjamin

(57) ABSTRACT

A polymer dispersant for pigments based on a graft copolymer which contains a new type of urea functional group as the pigment anchoring group. The urea groups are attached to the graft copolymer by a convenient method which involves reaction of hydroxyl functional groups built in the graft copolymer with a diisocyanate that is capped at one end with ammonia or a primary or secondary amine. The reaction is convenient and clean. Substantial crosslinking or gelling of the polymer can be easily avoided by judicious selection of appropriate ingredients and processing conditions. These materials are effective in dispersing and stabilizing a wide range of pigments in solvent based systems and are particularly useful in forming pigment dispersions that are used in a variety of solvent borne coating compositions for automobiles and trucks, where they provide improved efficiency of pigment use, lower paint viscosity, and reduced emission of volatile organic solvent.

23 Claims, No Drawings

GRAFT COPOLYMER WITH A URETHANE/UREA GROUP AS A PIGMENT DISPERSANT

BACKGROUND OF THE INVENTION

This invention relates to polymeric pigment dispersants, more particularly, it relates to graft copolymer pigment dispersants having a urethane/urea group as the pigment anchoring group.

Polymeric pigment dispersants which are effective for dispersing pigments in organic liquids are known in the art and are used to form pigment dispersions that are used in a variety of solvent borne coating compositions. Nowadays, such pigment dispersions are widely used, for example, in pigmented exterior solvent borne paints for automobiles and trucks.

Much of the past activity with polymeric dispersants has been with random copolymers, but these relatively inefficient materials are being replaced by structured pigment dispersants such as graft copolymers. The graft copolymer dispersants that have been used in the past are described in, for example, Huybrechts U.S. Pat. No. 5,852,123 issued Dec. 22, 1998. Such graft copolymers include a polymeric backbone and macromonomer side chains grafted onto the backbone and have attached to either the macromonomer or backbone, a polar group known as a pigment anchoring group which is designed to adsorb on the surface of a pigment particle and attach the copolymer dispersant to the pigment surface.

Urea groups, as described in Huybrechts U.S. Pat. No. 5,852,123 above, are extremely powerful pigment anchoring groups. Such groups are highly insoluble in organic solvents, selectively adsorbed by a wide range of pigments, and are not easily displaced from pigment surfaces by polar solvents or other polar functional groups present in the paint system which could compete for adsorption on the pigment surfaces. Stable and non-flocculating dispersions are thus easily formed, which enables the manufacture of paints with good spray rheology and excellent color uniformity. While the past work indicates that urea containing graft copolymers are outstanding dispersants; they also suffer from certain significant drawbacks. For instance, the urea anchoring groups are customarily introduced into the graft copolymer by copolymerizing monomers containing urea functional groups into the backbone, the macromonomer, or both. However, commercially available urea functional monomers are costly and few and usually are not supplied in pure form, which leads to quality problems.

Therefore, there is still a need for new chemistries and convenient methods to broaden the choices of the types of urea groups that can be used in order to optimize the manufacture and performance of the pigment dispersants described above.

SUMMARY OF THE INVENTION

The present invention provides a composition suitable for use as a pigment dispersant, which comprises a graft copolymer, preferably an acrylic graft copolymer, wherein the graft copolymer has a weight average molecular weight of about 3,000–150,000 and comprises about 10–90% by weight of a polymeric backbone and correspondingly about 90–10% by weight of macromonomer side chains attached to the backbone wherein (1) the polymeric backbone is formed from polymerized ethylenically unsaturated monomers and (2) the side chains are macromonomers attached to the backbone at a single terminal point and are formed from polymerized ethylenically unsaturated monomers and have a weight average molecular weight of about 1,000–30,000;

wherein the graft copolymer has attached to either the backbone, the side chains, or both a urethane/urea pigment anchoring group.

The urethane/urea anchoring group is preferably attached to the graft copolymer by reaction with functional groups on the backbone, side chains, or both.

In a preferred embodiment, the graft copolymer contains about 2 to 70% by weight, based on the total weight of the graft copolymer, of polymerized ethylenically unsaturated monomers containing functional hydroxyl groups that are polymerized into the backbone, the side chains or both, wherein the hydroxyl groups are reacted with a polyisocyanate compound bearing at least two isocyanate groups and the polyisocyanate compound is further reacted with ammonia or a compound bearing a primary or secondary amine to form the urethane/urea pigment anchoring group on the graft copolymer. By the term urethane/urea anchoring group, it is meant that a urea functional group is attached to the graft copolymer structure through a urethane linkage.

The present invention also provides stable and non-flocculating pigment dispersions formed by combining the pigment dispersant of this invention with any number of commercially available pigments and an appropriate organic liquid carrier. These dispersions are particularly useful in solvent borne coatings, especially automotive paints, where they impart uniform color to the paint and, at the same time, provide improved efficiency of pigment use, lower paint viscosity, and reduced emission of volatile organic solvents.

DETAILED DESCRIPTION OF THE INVENTION

The novel pigment dispersant of this invention comprises a graft copolymer having urethane/urea functional groups. The graft copolymer is formed by the copolymerization of ethylenically unsaturated backbone monomers in the presence of a macromonomer. The macromonomer, which preferably has only one terminal ethylenically unsaturated group, forms the side chains of the graft copolymer and is prepared first. It is then copolymerized with ethylenically unsaturated monomers chosen for the backbone composition to form the graft structure. The urethane/urea groups are then attached to the copolymer by reaction with functional groups on the backbone, side chains, or both.

The graft copolymer contains about 10–90% by weight, preferably about 20–80% by weight, of polymeric backbone and correspondingly about 90–10% by weight, preferably about 80–20% by weight, of side chains. The graft copolymer has a weight average molecular weight of about 3,000–150,000 and preferably about 10,000–100,000. The side chains of the graft copolymer are formed from macromonomers that have a weight average molecular weight of about 1,000–30,000, and preferably about 2,000 to 15,000. All molecular weights referred herein are determined by GPC (gel permeation chromatography) using a polymethyl methacrylate standard.

As indicated above, the macromonomer useful in the present invention contains a single terminal ethylenically unsaturated group which will polymerize with the backbone monomers to form the graft copolymer. The macromonomer is preferably formed from polymerized acrylic and methacrylic monomers. Most preferably, the macromonomer primarily contains polymerized monomers of methacrylic acid, its esters, or mixtures of these monomers. Preferred monomers include alkyl methacrylates, cycloaliphatic methacrylates, and aryl methacrylates. Typical alkyl methacrylates that can be used have 1–18 carbon atoms in the alkyl group such as methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, 2-(2-methoxyethoxy)ethyl methacrylate, ethoxytriethyleneglycol methacrylate, and the like. Cycloaliphatic methacrylates also can be used such as trimethylcyclohexyl methacrylate, t-butyl cyclohexyl methacrylate, cyclohexyl methacrylate, isobornyl methacrylate, and the like. Aryl methacrylates also can be used such as benzyl methacrylate, phenyl methacrylate, and the like.

Other ethylenically unsaturated monomers can also be used for forming the macromonomer such as acrylic acid, alkyl acrylates, cycloaliphatic acrylates, and aryl acrylates. Preferred alkyl acrylates have 1–18 carbon atoms in the alkyl group such as methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, 2-(2-methoxyethoxy)ethyl acrylate, 2-(2-ethoxyethoxy)ethyl acrylate, and the like. Cycloaliphatic acrylates can be used such as cyclohexyl acrylate, trimethylcyclohexyl acrylate, t-butyl cyclohexyl acrylate, and the like. Aryl acrylates such as benzyl acrylate, 2-phenoxyethyl acrylate, and the like can also be used. Apart from acrylic monomers, other polymerizable monomers that can be used for forming the macromonomer include vinyl aromatics such as styrene, t-butyl styrene and vinyl toluene, and the like. Methacrylonitrile and acrylonitrile monomers can also be used.

To ensure that the resulting macromonomer only has one terminal ethylenically unsaturated group which will polymerize with the backbone monomers to form the graft copolymer, the macromonomers are most conveniently prepared by a free radical polymerization method wherein ethylenically unsaturated monomers chosen for the macromonomer composition are polymerized in the presence of a catalytic cobalt chain transfer agent containing a $Co^{+2}$ group, a $Co^{+3}$ group, or mixtures of both. The macromonomer polymerization is carried out in an organic solvent or solvent blend using conventional polymerization initiators. Typically in the first step of the process for preparing the macromonomer, the monomers are blended with an inert organic solvent and a cobalt chain transfer agent and heated to the reflux temperature of the reaction mixture. In subsequent steps additional monomers and cobalt chain transfer agent and conventional azo or peroxide type polymerization initiators are added and polymerization is continued at reflux until a macromonomer is formed of the desired molecular weight.

Preferred cobalt chain transfer agents are described in U.S. Pat. Nos. 4,680,352 to Janowicz et al and 4,722,984 to Janowicz, hereby incorporated by reference in their entirety. Most preferred cobalt chain transfer agents are pentacyano cobaltate (II), diaquabis (borondiflurodimethylglyoximato) cobaltate (II), and diaquabis (borondifluorophenylglyoximato) cobaltate (II). Typically these chain transfer agents are used at concentrations of about 2–5000 ppm based on the total weight of the monomers depending on the particular monomers being polymerized and the desired molecular weight. By using such concentrations, macromonomers having the desired molecular weight can be conveniently prepared.

After the macromonomer is formed as described above, solvent is optionally stripped off and the backbone monomers are added to the macromonomer along with additional solvent and polymerization initiator, in order to prepare the graft copolymer structure by conventional free radical polymerization. The backbone monomers are copolymerized with the macromonomers via the single terminal unsaturated group of the macromonomer using any of the conventional azo or peroxide type initiators and organic solvents as described above. Polymerization is generally continued at the reflux temperature of the reaction mixture until a graft copolymer is formed having the desired molecular weight. The backbone, like the macromonomer, is formed from polymerized ethylenically unsaturated monomers and any of the monomers listed above for use in the macromonomer may also be used in the backbone. Preferably, the backbone is formed from polymerized acrylic and methacrylic monomers, and in particular primarily from polymerized acrylic acid, alkyl acrylate, cycloaliphatic acrylate, and aryl acrylate monomers as are listed above. Other preferred monomers include methacrylic acid, alkyl methacrylate, cycloaliphatic methacrylate, or aryl methacrylate monomers as are listed above. Vinyl aromatics and acrylonitrile monomers as listed above can also be used.

Typical polymerization initiators that may be used to form both the macromonomer and graft polymer are any of the commercially available peroxy or azo initiators, provided it has solubility in the solution of the solvents and the monomer mixture, and has an appropriate half life at the temperature of polymerization. "Appropriate half life" as used herein is a half life of about 10 minutes to 4 hours. Most preferred are azo type initiators such as 2,2'-azobis (isobutyronitrile), 2,2'-azobis(2,4-dimethylvaleronitrile), 2,2'-azobis(methylbutyronitrile), and 1,1'-azobis (cyanocyclohexane). Examples of peroxy based initiators are benzoyl peroxide, lauroyl peroxide, t-butyl peroxypivalate, t-butyl peroctoate which may also be used provided they do not adversely react with the chain transfer agents under the reaction conditions for macromonomers.

Typical solvents that may be used to form both the macromonomer and graft copolymer are alcohols, such as methanol, ethanol, n-propanol, and isopropanol; ketones, such as acetone, butanone, pentanone, hexanone, and methyl ethyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof. In the case where solvents having active hydrogens such as alcohols are used in the synthesis of the macromonomers or the graft copolymers, they need to be removed from the system to avoid interference with the subsequent chemistries used for the formation of the pigment anchoring groups thereon. This can be easily accomplished through stripping.

The graft copolymer of this invention also contains a polar urethane/urea pigment anchoring group attached to either or both the backbone or macromonomer side chains. Preferably, the pigment anchoring group is concentrated on the backbone of the graft copolymer. The pigment anchoring group employed in this invention is more specifically a urea group attached to graft copolymer via a urethane linkage, herein also referred to as a urethane/urea group. This attachment chemistry is clean and extremely easy to employ, which are the main benefits of this invention.

The urethane/urea pigment anchoring groups are preferably added by building functional hydroxyl groups into the backbone or side chains or both of the graft copolymer structure during its synthesis and then reacting the hydroxyl functional groups built in the graft copolymer structure with a compound bearing at least two isocyanate groups and further reacting the isocyanate compound with ammonia or a compound containing a primary or secondary amine to form at least one urea group on the graft copolymer structure attached to the graft copolymer through a urethane linkage.

Hydroxyl functional groups can be built in the graft copolymer structure by adding a suitable ethylenically unsaturated hydroxyl functional monomer during the polymerization of the macromonomer, the backbone, or both. Hydroxyl functional monomers containing primary or secondary hydroxyl groups, or mixtures of these monomers, are generally used. The primary hydroxyl group has relatively higher reactivity towards the isocyanate groups for faster reaction. The secondary hydroxyl group is slower reacting with the isocyanate group, but provides more control. Accordingly, the types of hydroxyl groups and their relative amounts will vary from case to case depending on the desired degree of reactivity and control. Preferred monomers containing such hydroxyl groups are hydroxy alkyl acrylates and methacrylates having 1–10, preferably 1–4 carbon atoms in the alkyl group. Examples of monomers containing primary hydroxyl groups include hydroxy methyl acrylate, hydroxy methyl methacrylate, 2-hydroxy ethyl acrylate, 2-hydroxy ethyl methacrylate, 3-hydroxy propyl acrylate, 3-hydroxy propyl methacrylate, 4-hydroxy butyl acrylate, 4-hydroxy butyl methacrylate and the like. Examples of monomers containing secondary hydroxyl groups include 2-hydroxy propyl acrylate, 2-hydroxy propyl methacrylate, 2-hydroxy butyl acrylate, 2-hydroxy butyl methacrylate, and the like.

The amount of hydroxyl functional monomer required will also vary from case to case depending upon the desired degree of pigment anchoring necessary for the particular end use application. Generally, the concentration of hydroxyl functional monomers that are used to form the pigment anchoring groups in the graft copolymer should be at least about 1% by weight, based on the total weight of the graft copolymer, to impart appropriate pigment anchoring functionality to the graft copolymer. At lower concentrations, there may not be sufficient interaction with the pigment to avoid flocculation, particularly in more polar solvents. The preferred concentration of these monomers that are used to form the pigment anchoring groups is about 2 to about 70% by weight, and more preferably about 5–20% by weight, based on the total weight of the graft copolymer.

The above mentioned functional hydroxyl groups once built into the backbone, side chains or both are then subsequently reacted with a polyisocyanate compound having, on an average basis, at least two isocyanate groups per molecule to form a urethane linkage on the graft copolymer. During this reaction some crosslinking may occur to produce a fraction of higher molecular weight polymers, but the reaction conditions are preferably chosen so that the crosslinking reaction is minimized and at least one unreacted isocyanate group remains in the graft copolymer. The reaction conditions may also be chosen, as is further described below, so that a portion of the hydroxyl groups remain unreacted or free for crosslinking reactions in the coating. The polyisocyanates which are used in the forgoing reaction are preferably organic polyisocyanates. These can be any suitable aliphatic, cycloapliphatic, or aromatic polyisocyanates. Diisocyanates are generally preferred, although higher polyisocyanates, such as triisocyanates can also be used. Isocyanates compounds with differential reactivities between the isocyanate groups are most preferred.

Examples of suitable aliphatic diisocyanates are straight chain aliphatic diisocyanates such as 1,4-tetramethylene diisocyanate and 1,6-hexamethylene diisocyanate and the like. Also, cycloaliphatic diisocyanates can be employed. Examples include isophorone diisocyanate and 4,4'-methylene-bis-(cyclohexyl isocyanate) and the like. Examples of suitable aromatic diisocyanates are p-phenylene diisocyanate, methylene diphenyl diisocyanate, polymeric methylene diphenyl diisocyanate, and 2,4- or 2,6-toluene diisocyanate and the like. Examples of some higher polyisocyanates such as triisocyanates are methylene triphenyl triisocyanate, 1,3,5-benzene triisocyanate, 2,4,6-toluene triisocyanate and the like. Other higher polyisocyanates such as isocyanate prepolymers can also be used. These are formed from an organic polyisocyanate and a polyol. Any of the aforementioned polyisocyanates can be used with a polyol to form the prepolymer. Polyols such as trimethylol alkanes like trimethylol propane or ethane can be used. Polymeric polyols such as polycaprolactone diols and triols can also be used. Aromatic diisocyanates, such as 2,4-toluene diisocyanate, are generally most preferred.

Catalysts are also preferably used during this reaction to optimize the reaction between the hydroxyl and isocyanate groups. Typically useful catalysts are alkyl tin laurates such as dibutyl tin dilaurate, dibutyl tin diacetate, tertiary amines such as triethylene diamine, and the like.

To complete the formation of the anchoring groups, the unreacted isocyanate end groups remaining on the graft copolymer are then reacted, i.e., capped, with ammonia or a primary or secondary amine containing compound to provide the graft copolymer with pendant urethane/urea anchoring groups. The reaction conditions are preferably chosen so that 100% of the remaining unreacted isocyanate groups are reacted, or as close to 100% as can be reasonably achieved, leaving essentially no unreacted isocyanate groups in the dispersant molecule.

Examples of primary amines which are useful for forming the urea anchoring groups are aromatic amines, aliphatic amines, and primary amines containing heterocyclic groups. They may be unsubstituted or may contain substituents such as, e.g., hydroxy, ester, acyloxy, amide, nitrile, halogen, haloalkyl, alkoxy, and the like. Aromatic amines that can be used include N-benzylamine, phenethylamine, 4-phenylbutylamine, 2,2-diphenylethylamine, and the like. Aliphatic amines can also be used such as propylamine, butylamine, aminoethanol, 2-amino-1-butanol, N,N-dimethylaminopropylamine, and the like. Primary amines containing heterocyclic groups can also be advantageously used because additional interactions between the heterocyclic groups and the pigment surfaces may further enhance the dispersion stability. The heterocyclic group can be a mono- or dinuclear five to seven member ring containing one or more nitrogen atoms as part of the ring and optionally an oxygen and/or sulfur atom. Useful examples include 4-(aminoethyl)morpholine, 2-(2-aminoethyl)-1-methyl pyrrolidine, 1-(2-aminoethyl) pyrrolidine, 2-(2-aminoethyl) pyridine, 1-(2-aminoethyl) piperazine, 1-(2-aminoethyl) piperidine, 1-(3-aminopropyl) imidazole, 4-(3-aminopropyl) morpholine, 1-(3-aminopropyl)-2-pipecoline, 1-(3-aminopropyl)-2-pyrrolidinone, and the like. Primary amines containing heterocyclic imidazole groups are particularly preferred.

Examples of secondary amines which are useful for forming the urea anchoring groups are aromatic amines, aliphatic amines, and secondary amines containing heterocyclic groups. They may be unsubstituted or may contain substituents such as, e.g., hydroxy, ester, acyloxy, amide, nitrile, halogen, haloalkyl, alkoxy, and the like. Preferred secondary aromatic amines include N-benzyl methylamine, N-benzylethanolamine, N,N-dibenzylamine, and the like. Aliphatic amines can also be used such as N,N-dimethylamine, N,N-diethylamine, N,N-dibutylamine, N,N-diethanolamine, and the like. Secondary amines containing heterocyclic groups can also be advantageously used. The heterocyclic group can be a mono- or dinuclear five to seven member ring containing one or more nitrogen atoms as part of the ring and optionally an oxygen and/or sulfur atom. Useful examples include 2-(2-methylaminoethyl)pyridine, 1-phenylpiperazine, 1-benzyl piperazine, 3-(3-pyridylmethylamines) propionitrile, and the like.

In the preferred process for forming the urethane/urea anchoring groups, after the graft copolymer described above is formed, all solvents having active hydrogens including water need to be removed in order not to interfere with the reaction between the hydroxyl groups on the graft copolymer and the polyisocyanate. This can be easily accomplished by stripping, and azeotropic mixtures of the solvents with water such as toluene/water mixture can be advantageously used for this purpose. Polyisocyanate and additional inert solvent are then added to the polymer solution and the reaction is continued until all of the desired isocyanate groups are reacted and then ammonia gas may be passed through the polymer solution or a compound having primary or secondary amine is added to the polymer solution and the reaction is continued until all of the remaining unreacted isocyanate groups are reacted and the pendant urea anchoring groups are formed. Another approach to the introduction of such urea anchoring groups into the graft copolymer is to first react the polyisocyanate compounds with a primary or secondary amine and then react the reaction product with the hydroxyl functional groups on the backbone, the side chains, or both.

In addition to the urethane/urea pigment anchoring groups mentioned above, the graft copolymer may also contain one or more additional anchoring groups in the selected anchoring segment. Particularly useful anchoring groups that work nicely in conjunction with urethane/urea anchoring groups described above, are acyclic or cyclic amide groups. These anchoring groups can be, and preferably are, obtained by copolymerizing ethylenically unsaturated monomers containing acyclic or cyclic amide functionality into the desired segment during its polymerization. Acrylic, methacrylic and other vinyl amide monomers are generally preferred.

Useful examples of monomers that can be used to introduce acyclic amide groups include methacrylamides such as N-methylmethacrylamide, N-ethylmethacrylamide, N-octylmethacrylamide, N-dodecylmethacrylamide, N-(isobutoxymethyl)methacrylamide, N-phenylmethacrylamide, N-benzyl methacrylamide, N,N-dimethyl methacrylamide, and the like and acrylamides such as N-methylacrylamide, N-ethylacrylamide, N-t-butylacrylamide, N-(isobutoxymethyl)acrylamide, N,N-dimethylacrylamide, N,N-diethylacrylamide, N,N-dibutylacrylamide, and the like. Other monomers that can be used to introduce cyclic amide groups include methacrylic and acrylic and other vinyl monomers bearing cyclic amide groups, especially N-vinyl-2-pyrrolidinone and the like. N-vinyl caprolactam can also be used. Generally, the graft copolymers may contain up to 20% by weight, based on the total weight of the copolymer, of such amide functional monomers.

In addition to the anchoring groups described above, the graft copolymer may also, and preferably does, contain up to about 30% by weight, based on the total weight of the graft copolymer, of ethylenically unsaturated monomers that contain unreacted hydroxyl groups that will react with the film forming components present in the paint composition which in turn enables the dispersant to become a permanent part of the final network. This structure enhances film adhesion, improves the overall mechanical properties of the paint in general, and prevents deterioration or delamination of the film upon aging, as may occur if the dispersant remained an unreacted component. The unreacted hydroxyl groups, for example, may be placed in the backbone or in the macromonomer arms, or both and may be obtained by converting only a portion of the hydroxyl groups to urethane/urea anchoring groups.

Particularly useful graft copolymers of this invention are exemplified in the examples given below.

While not wishing to be bound by any particular theory, these graft polymers when used as pigment dispersants are thought to work by anchoring onto and forming a layer of polymer surrounding the pigment particle, which layer has a discrete portion that is soluble in and extends into the surrounding organic solvent medium to provide steric stabilization of the pigment particles. The pigment particles then do not come close enough to one another to flocculate, unless there is insufficient interaction between the dispersant polymer and the pigment surfaces. The pigment anchoring groups employed herein have been found to effectively interact with a much wider range of pigments, which enables the graft copolymers of the present invention to be selectively adsorbed by a wider range of pigments and not be displaced from pigment surfaces by polar solvents or other polar functional groups present in the paint system which could compete for adsorption on the pigment surfaces. Stable and non-flocculating dispersions or millbases can thus easily be formed from the graft copolymers of this invention.

To form a pigment dispersion or a millbase, pigments are typically added to the graft copolymer in the customary organic solvent or blend and are dispersed using conventional techniques such as high speed mixing, ball milling, sand grinding, attritor guiding, or two or three roll milling. The amount of graft copolymer dispersant needs to be sufficient to cover the surface areas of the pigment particles. In general, the resulting pigment dispersion has a dispersant to pigment weight ratio of about 2/100 to 200/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phthalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

It may be desirable to add other optional ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyester urethanes, polyesters, alkyds, polyethers and the like.

Pigment dispersions of this invention can be added to a variety of solvent borne coating or paint compositions such as primers, primer surfacers, topcoats which may be monocoats, or basecoats of a clearcoat/basecoat finish. These compositions may contain film-forming binder polymers such as hydroxy functional acrylic and polyester resins and crosslinking agents such as blocked isocyanates, alkylated melamines, polyisocyanates, epoxy resins, and the like. Preferably, the graft copolymer contains functional groups, that upon curing of the coating composition, will react with the other film-forming components and become part of the final film network. Also since the graft copolymer is an excellent dispersant, the ratio of polymer to pigment or polymer used to disperse is less than used with conventional dispersants. Further, the graft polymers of this invention allow for the use of higher molecular weight binder polymers for the coating which improves the film properties of the coating, due to the improved rheology (i.e., lower viscosity) of the dispersions obtained herein. Lastly, since the type of urea anchoring groups used herein are easier and more convenient to use, a much more robust dispersant can be formed.

The following examples illustrate the invention. All parts and percentages are on a weight basis unless otherwise indicated. All molecular weights are determined by (GPC) gel permeation chromatography using a polymethyl methacrylate standard. Mn represents number average molecular weight and Mw represents weight average molecular weight. All viscosity measurements are reported using a Gardner Holtz scale.

EXAMPLES

Macromonomers were prepared and formulated into graft copolymer dispersants and these polymeric dispersants were then formulated into pigment dispersions which were evaluated for performance.

Example 1
Preparation of BMA/MMA Macromonomer, 50/50% by Weight

This example illustrates the preparation of a macromonomer that can be used to form a graft copolymer of this invention. A 12-liter flask was equipped with a thermometer, stirrer, additional funnels, heating mantel, reflux condenser and a means of maintaining a nitrogen blanket over the reactants. The flask was held under nitrogen positive pressure and the following ingredients were employed.

|  | Weight (gram) |
| --- | --- |
| Portion 1 |  |
| Methyl ethyl ketone | 1320 |
| Methyl methacrylate (MMA) | 518.4 |
| Butyl methacrylate (BMA) | 518.4 |
| Portion 2 |  |
| Diaquabis(borondifluorodiphenyl glyoximato) cobaltate (II), Co(DPG-BF$_2$) | 0.128 |
| Methyl ethyl ketone | 167.9 |
| Portion 3 |  |
| 2,2'-azobis(methylbutyronitrile) (Vazo ® 67 by DuPont Co., Wilmington, DE) | 8.49 |
| Methyl ethyl ketone | 110 |
| Portion 4 |  |
| Methyl methacrylate (MMA) | 2073.6 |
| Butyl methacrylate (BMA) | 2073.6 |

-continued

|  | Weight (gram) |
| --- | --- |
| Portion 5 |  |
| 2,2'-azobis(methylbutyronitrile) (Vazo ® 67 by DuPont Co., Wilmington, DE) | 84.9 |
| Methyl ethyl ketone | 1100 |
| Total | 7975.392 |

Portion 1 mixture was charged to the flask and the mixture was heated to reflux temperature and refluxed for about 20 minutes. Portion 2 solution was then added to the flask over 5 minutes and the reaction mixture was refluxed for 10 minutes. Portion 3 was then added over 5 minutes while the reaction mixture was held at reflux temperature. Portion 4 and Portion 5 were then simultaneously fed to the reactor over 240 minutes while the reaction mixture was held at reflux temperature throughout the course of additions. Reflux was continued for another 2 hours and the solution was cooled to room temperature and filled out. The resulting macromonomer solution was a light yellow clear polymer solution and had a solid content of about 62.0%. The macromonomer had a 5,288 Mw and 3,367 Mn.

Example 2
Preparation of a Graft Copolymer with a Urethane/Urea Group on the Backbone This example shows the preparation of a graft copolymer of this invention containing urethane/urea groups on the backbone, specifically methyl acrylate-co-hydroxypropyl acrylate (toluene 2,4-diisocyanate/ammonia)-g-butyl methacrylate-co-methyl methacrylate, 12.87/5.51(7.38/0.72)//36.76/36.76% by weight, from the macromonomer prepared above.

A 2-liter flask was equipped as in Example 1. The flask was held under nitrogen positive pressure and the following ingredients were employed.

|  | Weight (gram) |
| --- | --- |
| Portion 1 |  |
| Macromonomer of Example 1 | 787.7 |
| Ethyl acetate | 5.0 |
| Portion 2 |  |
| Methyl acrylate | 89.6 |
| Hydroxypropyl acrylate | 38.4 |
| Portion 3 |  |
| t-Butyl peroctoate (Elf Atochem North America, Inc., Philadelphia, PA) | 10.0 |
| Ethyl acetate | 90.0 |
| Portion 4 |  |
| Ethyl acetate | 200.0 |
| Portion 5 |  |
| Toluene 2,4-diisocyanate (Bayer Corp., Pittsburgh, PA) | 52.4 |
| Dibutyltin dilaurate (Aldrich Chemical Co., Milwaukee, WI) | 0.128 |
| Portion 6 | 5.23 |
| Ammonia (anhydrous) |  |
| Portion 7 | 300.0 |
| Amyl acetate |  |
| Portion 8 | 304.4 |
| Amyl acetate |  |
| Total | 1882.9 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for another hour. After cooling, a sample was analyzed by GPC. The graft copolymer had a 13,300 Mw and a 6,067 Mn. Portion 4 was added, and 50 g of a water/ethyl acetate azeotropic mixture was distilled off. Portion 5 was added and the mixture was refluxed for about 2 hours. The NCO content was analyzed to ensure that about 50% of the NCO groups had reacted with the hydroxyl groups on the polymer. The reaction mixture was cooled to below reflux temperature. Portion 6 was bubbled through the reaction mixture until the remaining NCO groups were converted to the urea groups according to the IR. Portion 7 was added, and 440 g of volatile solvents were distilled off. Portion 8 was added. After cooling, the polymer solution was filled out to yield a 50.3% milky polymer solution. This graft copolymer contains a copolymer of methyl acrylate, hydroxypropyl acrylate (coupled with toluene 2,4-diisocyanate/ammonia adduct) in the backbone and a random copolymer of butyl methacrylate and methyl methacrylate in the arms. The graft copolymer had a 22,770 Mw and a 7,144 Mn and a Gardner-Holtz viscosity of S.

Example 3
Preparation of a Graft Copolymer with a Urethane/Urea Group on the Backbone This example shows the preparation of a graft copolymer of this invention containing urethane/urea groups on the backbone, specifically butyl acrylate-co-hydroxypropyl acrylate (toluene 2,4-diisocyanate/ammonia)-g-butyl methacrylate-co-methyl methacrylate, 16.54/9.19(7.38/0.72)//33.08/33.08% by weight, from the macromonomer prepared above.

A 2-liter flask was equipped as in Example 1. The flask was held under nitrogen positive pressure and the following ingredients were employed.

|  | Weight (gram) |
|---|---|
| Portion 1 |  |
| Macromonomer of Example 1 | 708.9 |
| Ethyl acetate | 22.0 |
| Portion 2 |  |
| Butyl acrylate | 115.2 |
| Hydroxypropyl acrylate | 64.0 |
| Portion 3 |  |
| t-Butyl peroctoate (Elf Atochem North America, Inc., Philadelphia, PA) | 10.0 |
| Ethyl acetate | 100.0 |
| Portion 4 | 200.0 |
| Ethyl acetate |  |
| Portion 5 |  |
| Toluene 2,4-diisocyanate (Bayer Corp., Pittsburgh, PA) | 52.4 |
| Dibutyltin dilaurate (Aldrich Chemical Co., Milwaukee, WI) | 0.128 |
| Portion 6 | 5.23 |
| Ammonia (anhydrous) |  |
| Portion 7 | 300 |
| Amyl acetate |  |
| Portion 8 | 304.9 |
| Amyl acetate |  |
| Total | 1882.8 |

The procedure of Example 2 was repeated. The prepolymer (before reaction with toluene 2,4-diisocyanate) had a 14,124 Mw and a 6,892 Mn. After final cooling, the polymer solution was filled out to yield a 51.1% milky polymer solution. This graft copolymer contains a copolymer of butyl acrylate, hydroxypropyl acrylate (about 60% was coupled with toluene 2,4-diisocyanate/ammonia adduct) in the backbone and a random copolymer of butyl methacrylate and methyl methacrylate in the arms. Also, about 40% of the hydroxyl groups remained free for crosslinking reactions in the coating. The graft copolymer had a 33,248 Mw and 88,701 Mn and a Gardner-Holtz viscosity of W.

Example 4
Preparation of a Graft Copolymer with a Urethane/Urea Group on the Backbone This example shows the preparation of a graft copolymer of this invention containing urethane/urea groups on the backbone, specifically methyl acrylate-co-hydroxypropyl acrylate (toluene 2,4-diisocyanate/N-butylamine)-g-butyl methacrylate-co-methyl methacrylate, 12.57/8.98(7.21/3.03)//34.11/34.11% by weight, from the macromonomer prepared above.

A 2-liter flask was equipped as in Example 1. The flask was held under nitrogen positive pressure and the following ingredients were employed.

|  | Weight (gram) |
|---|---|
| Portion 1 |  |
| Macromonomer of Example 1 | 748.3 |
| Ethyl acetate | 8.0 |
| Portion 2 |  |
| Methyl acrylate | 89.6 |
| Hydroxypropyl acrylate | 64.0 |
| Portion 3 |  |
| t-Butyl peroctoate (Elf Atochem North America, Inc., Philadelphia, PA) | 10.0 |
| Ethyl acetate | 100.0 |
| Portion 4 | 200.0 |
| Ethyl acetate |  |
| Portion 5 |  |
| Toluene 2,4-diisocyanate (Bayer Corp., Pittsburgh, PA) | 51.4 |
| Dibutyltin dilaurate (Aldrich Chemical Co., Milwaukee, WI) | 0.128 |
| Portion 6 | 22.0 |
| N-butylamine (Aldrich Chemical Co., Milwaukee, WI) |  |
| Portion 7 | 330 |
| Amyl acetate |  |
| Portion 8 | 292.5 |
| Amyl acetate |  |
| Total | 1915.9 |

The procedure of Example 2 was repeated with the exception that Portion 6 was very slowly added through the addition funnel, instead of being bubbled through the reaction mixture as in Example 2, because the reaction was exothermic. The prepolymer (before reaction with toluene 2,4-diisocyanate) had a 17,529 Mw and a 7,269 Mn. After final cooling, the polymer solution was filled out to yield a 53.2% milky polymer solution. This graft copolymer contains a copolymer of methyl acrylate, hydroxypropyl acrylate (coupled with toluene 2,4-diisocyanate/N-butylamine adduct) in the backbone and a random copolymer of butyl methacrylate and methyl methacrylate in the arms. The final graft copolymer had a 45,717 Mw and a 10,273 Mn. Upon final cooling the graft copolymer solution became extremely viscous and wax-like.

Example 5
Preparation of a Graft Copolymer with a Urethane/Urea Group on the Backbone This example shows the preparation of a graft copolymer of this invention containing urethane/urea groups on the backbone, specifically methyl acrylate-co-2-hydroxyethyl acrylate (isophorone diisocyanate/ammonia)-g-butyl methacrylate-co-methyl methacrylate, 14.24/5.34(10.22/0.78)//34.71/34.71% by weight, from the macromonomer prepared above.

A 2-liter flask was equipped as in Example 1. The flask was held under nitrogen positive pressure and the following ingredients were employed.

|  | Weight (gram) |
| --- | --- |
| Portion 1 | |
| Macromonomer of Example 1 | 768.0 |
| Ethyl acetate | 12.0 |
| Portion 2 | |
| Methyl acrylate | 102.4 |
| 2-Hydroxyethyl acrylate | 38.4 |
| Portion 3 | |
| t-Butyl peroctoate (Elf Atochem North America, Inc., Philadelphia, PA) | 10.0 |
| Ethyl acetate | 90.0 |
| Portion 4 | 200.0 |
| Ethyl acetate | |
| Portion 5 | |
| Isophorone diisocyanate (Bayer Corp., Pittsburgh, PA) | 74.3 |
| Dibutyltin dilaurate (Aldrich Chemical Co., Milwaukee, WI) | 0.128 |
| Portion 6 | |
| Ammonia (anhydrous) | 5.13 |
| Portion 7 | |
| Amyl acetate | 300.0 |
| Portion 8 | |
| Amyl acetate | 326.8 |
| Total | 1922.0 |

The procedure of Example 2 was repeated. The prepolymer (before reaction with isophorone diisocyanate) had a 15,935 Mw and a 6,941 Mn. After final cooling, the polymer solution was filled out to yield a 51.7% milky polymer solution. This graft copolymer contains a copolymer of methyl acrylate, 2-hydroxyethyl acrylate (coupled with isophorone diisocyanate/ammonia adduct) in the backbone and a random copolymer of butyl methacrylate and methyl methacrylate in the arms. The graft copolymer had a 37,182 Mw and a 9,022 Mn and a Gardner-Holtz viscosity of W.

Example 6
Preparation of a Graft Copolymer with a Urethane/Urea Group on the Backbone This example shows the preparation of a graft copolymer of this invention containing urethane/urea groups on the backbone, specifically butyl acrylate-co-2-hydroxyethyl acrylate (toluene 2,4-diisocyanate/ammonia)-g-butyl methacrylate-co-methyl methacrylate, 21.84/5.46(8.19/0.80)//31.85/31.85% by weight, from the macromonomer prepared above.

A 2-liter flask was equipped as in Example 1. The flask was held under nitrogen positive pressure and the following ingredients were employed.

|  | Weight (gram) |
| --- | --- |
| Portion 1 | |
| Macromonomer of Example 1 | 689.2 |
| Ethyl acetate | 30.0 |
| Portion 2 | |
| Butyl acrylate | 153.6 |
| 2-Hydroxyethyl acrylate | 38.4 |
| Portion 3 | |
| t-Butyl peroctoate (Elf Atochem North America, Inc., Philadelphia, PA) | 10.0 |
| Ethyl acetate | 100.0 |
| Portion 4 | |
| Ethyl acetate | 200.0 |
| Portion 5 | |
| Toluene 2,4-diisocyanate (Bayer Corp., Pittsburgh, PA) | 58.2 |
| Dibutyltin dilaurate (Aldrich Chemical Co., Milwaukee, WI) | 0.0128 |
| Portion 6 | |
| Ammonia (anhydrous) | 5.75 |
| Portion 7 | |
| Amyl acetate | 300.0 |
| Portion 8 | |
| Amyl acetate | 311.2 |
| Total | 1896.4 |

The procedure of Example 2 was repeated. The prepolymer (before reaction with toluene 2,4-diisocyanate) had a 15,693 Mw and a 7,030 Mn. After final cooling, the polymer solution was filled out to yield a 51.0% milky polymer solution. This graft copolymer contains a copolymer of butyl acrylate, 2-hydroxyethyl acrylate (coupled with toluene 2,4-diisocyanate/ammonia adduct) in the backbone and a random copolymer of butyl methacrylate and methyl methacrylate in the arms. The graft copolymer had a 33,787 Mw and a 8,557 Mn and a Gardner-Holtz viscosity of W.

Example 7
Preparation of a Graft Copolymer with a Urethane/Urea Group on the Backbone This example shows the preparation of a graft copolymer of this invention containing urethane/urea groups on the backbone, specifically methyl acrylate-co-hydroxypropyl acrylate (toluene 2,4-diisocyanate/1-(3-aminopropyl) imidazole)-g-butyl methacrylate-co-methyl methacrylate, 12.30/8.79(7.06/5.07)//33.39/33.39% by weight, from the macromonomer prepared above.

A 2-liter flask was equipped as in Example 1. The flask was held under nitrogen positive pressure and the following ingredients were employed.

|  | Weight (gram) |
| --- | --- |
| Portion 1 | |
| Macromonomer of Example 1 | 748.3 |
| Ethyl acetate | 8.0 |
| Portion 2 | |
| Methyl acrylate | 89.6 |
| Hydroxypropyl acrylate | 64.0 |

-continued

| | Weight (gram) |
|---|---|
| Portion 3 | |
| t-Butyl peroctoate (Elf Atochem North America, Inc., Philadelphia, PA) | 10.0 |
| Ethyl acetate | 100.0 |
| Portion 4 | |
| Butyl acetate | 300.0 |
| Portion 5 | |
| Toluene 2,4-diisocyanate (Bayer Corp., Pittsburgh, PA) | 52.4 |
| Dibutyltin dilaurate (Aldrich Chemical Co., Milwaukee, WI) | 0.0128 |
| Portion 6 | |
| 1-(3-aminopropyl)imidazole (Aldrich Chemical Co., Milwaukee, WI) | 37.7 |
| Portion 7 | |
| Amyl acetate | 200.0 |
| Portion 8 | |
| Amyl acetate | 158.6 |
| Total | 1768.6 |

The procedure of Example 2 was repeated with the following exceptions: Portion 6 was very slowly added through the addition funnel, instead of being bubbled through the reaction mixture as in Example 2, because the reaction was exothermic; and after Portion 7 was added, only 260 g of volatile solvents were distilled off. The prepolymer (before reaction with toluene 2,4-diisocyanate) had a 21,503 Mw and a 8,142 Mn. After final cooling, the polymer solution was filled out to yield a 51.2% milky polymer solution. This graft copolymer contains a copolymer of methyl acrylate, hydroxypropyl acrylate (about 60% was coupled with toluene 2,4-diisocyanate/1-(3-aminopropyl)imidazole adduct) in the backbone and a random copolymer of butyl methacrylate and methyl methacrylate in the arms. About 40% of the polymerized hydroxypropyl acrylate remained free for crosslinking reactions in the coating. The graft copolymer had a 85,601 Mw and a 7,364 Mn and a Gardner-Holtz viscosity of X.

Example 8

Preparation of a Graft Copolymer with both a Urethane/Urea Group and Cyclic Amide Group on the Backbone This example shows the preparation of a graft copolymer of this invention containing urethane/urea groups and cyclic amide groups on the backbone, specifically 1-vinyl-2-pyrrolidinone-co-methyl acrylate-co-hydroxypropyl acrylate (toluene 2,4-diisocyanate/ammonia)-g-butyl methacrylate-co-methyl methacrylate, 5.51/9.19(9.19(7.38/0.72)//34.00/34.00% by weight, from the macromonomer prepared above.

A 2-liter flask was equipped as in Example 1. The flask was held under nitrogen positive pressure and the following ingredients were employed.

| | Weight (gram) |
|---|---|
| Portion 1 | |
| Macromonomer of Example 1 | 748.3 |
| Ethyl acetate | 8.4 |

-continued

| | Weight (gram) |
|---|---|
| Portion 2 | |
| 1-Vinyl-2-pyrrolidinone (Aldrich Chemical Co., Milwaukee, WI) | 38.4 |
| Methyl acrylate | 51.2 |
| Hydroxypropyl acrylate | 64.0 |
| Portion 3 | |
| t-Butyl peroctoate (Elf Atochem North America, Inc., Philadelphia, PA) | 10.0 |
| Ethyl acetate | 100.0 |
| Portion 4 | |
| Butyl acetate | 400.0 |
| Portion 5 | |
| Toluene 2,4-diisocyanate (Bayer Corp., Pittsburgh, PA) | 52.4 |
| Portion 6 | |
| Ammonia (anhydrous) | 5.13 |
| Portion 7 | |
| Amyl acetate | 200.0 |
| Portion 8 | |
| Amyl acetate | 292.9 |
| Total | 1970.7 |

The procedure of Example 2 was repeated with the exception that after Portion 7 was added only 260 g of volatile solvents were distilled off. The prepolymer (before reaction with toluene 2,4-diisocyanate) had a 24,403 Mw and 8,192 Mn. After final cooling, the polymer solution was filled out to yield a 51.7% milky polymer solution. This graft copolymer contains a copolymer of 1-vinyl-2-pyrrolidinone, methyl acrylate, and hydroxypropyl acrylate (about 60% was coupled with toluene 2,4-diisocyanate/ammonia adduct) in the backbone and a random copolymer of butyl methacrylate and methyl methacrylate in the arms. About 40% of the polymerized hydroxypropyl acrylate remained free for crosslinking reactions in the coating. The graft copolymer had a 109,549 Mw and a 12,270 Mn and a Gardner-Holtz viscosity of W.

Comparative Example 1

This shows the preparation of a graft copolymer containing no specific pigment anchoring groups for comparative purposes, specifically methyl acrylate-co-2-hydroxyethyl acrylate-g-butyl methacrylate-co-methyl methacrylate, 17/8//37.5/37.5% by weight, from a macromonomer using the following ingredients.

| | Weight (gram) |
|---|---|
| Portion 1 | |
| Macromonomer of Example 1 | 830.8 |
| Ethyl acetate | 10.0 |
| Portion 2 | |
| Methyl acrylate | 122.4 |
| 2-Hydroxyethyl acrylate | 57.6 |
| Portion 3 | |
| t-Butyl peroctoate (Elf Atochem North America, Inc., Philadelphia, PA) | 9.0 |
| Ethyl acetate | 90.0 |

-continued

| | Weight (gram) |
|---|---|
| Portion 4 | |
| Propyleneglycol monomethyl ether acetate | 480.2 |
| Total | 1600.00 |

The procedure of the prepolymer (before reaction with toluene 2,4-diisocyanate) of Example 2 was repeated to yield a 49.1% clear polymer solution. This graft copolymer contains a copolymer of methyl acrylate, and 2-hydroxyethyl acrylate in the backbone and a random copolymer of butyl methacrylate and methyl methacrylate in the arms. The graft copolymer had a 52,927 Mw and 12,000 Mn and a Gardner-Holtz viscosity of P.

Example 9
Evaluation of Dispersant Properties

The dispersant effectiveness was determined by sand-grinding a mixture of pigment, solvent, and dispersant, and observing the dispersion quality under an Olympus microscope, 40×. The well dispersed system would have a uniform appearance and the pigment particles would show vigorous Brownian motion. In contract, the flocculated systems would have islands of flocculated pigment chunks interspersed with areas of relatively clear solvent.

The dispersion samples were prepared by the following procedure. To a 2 oz. glass bottle, 15 gm of sand, 20 gm of butyl acetate, 2 gm of pigment and 1 gm of the graft copolymer dispersant solution were added. The bottle was sealed and agitated on a Red Devil plant shaker for 15 minutes.

| | | | | Results | | | | |
|---|---|---|---|---|---|---|---|---|
| Pigment | Ex 2 | Ex 3 | Ex 4 | Ex 5 | Ex 6 | Ex 7 | Ex 8 | CEx 1 |
| 1 | D | D | F | F | D | F | D | F |
| 2 | SF | D | D | D | D | D | SF | F |
| 3 | D | D | D | D | D | D | D | D |
| 4 | D | D | D | D | D | D | D | F |
| 5 | D | D | D | D | D | D | D | D |
| 6 | F | D | F | F | D | D | SF | F |
| 7 | D | D | D | D | D | D | D | D |
| 8 | D | D | D | D | D | D | D | D |
| 9 | D | D | D | D | D | D | D | F |
| 10 | SF | D | F | F | SF | F | D | F |
| 11 | D | D | D | SF | D | D | D | D |
| 12 | D | D | D | D | D | D | D | F |
| 13 | D | D | D | D | D | D | D | D |
| 14 | D | D | D | D | D | D | D | D |
| 15 | D | D | D | D | D | D | D | D |

D: Deflocculated or dispersed
SF: Slightly flocculated
F: Flocculated

1. Irgazin DDP Red BO (Ciba-Geigy Corp., Pigment Div., Newport, Del.)
2. Raven 5000 carbon black (Columbian Chemicals Co., Atlanta, Ga.))
3. Titanium dioxide R706 (DuPont Co., Wilmington, Del.)
4. Sunfast green 7 (Sun Chemical Corp., Cincinnati, Ohio))
5. Endurophthal blue BT-617D (Clariant Corp., Coventry, R.I.)
6. Irgazin blue ATC (Ciba-Geigy Corp., Pigment Div., Newport, Del.)
7. Magenta RT-355D (Ciba-Geigy Corp., Pigment Div., Newport, Del.)
8. Perylene maroon R-6436 (Bayer Corp., Pittsburgh, Pa.)
9. Sicotrans red (BASF Corp., Colorant Division, Mount Olive, N.J.))
10. Hostaperm yellow H-3G (Clariant Corp., Coventry, R.I.)
11. Irgacolor yellow (Ciba-Geigy Corp., Pigment Div., Newport, Del.)
12. Irgazin blue X-3367 (Ciba-Geigy Corp., Pigment Div., Newport, Del.)
13. Violet RT-101D (Ciba-Geigy Corp., Pigment Div., Newport, Del.)
14. Bayferrox 3920 (Bayer Corp., Pittsburgh, Pa.)
15. Monastral magenta RT-143D (Ciba Geigy Corp., Pigment Div., Newport, Del.)

Based on these test results, the graft structure and the polar groups such as the hydroxyl groups have provided some dispersing power to the polymer as in the Comparative Example 1. However, the ones with the graft structure where the pigment anchoring groups are segmented from the stabilizing groups, and having the urethane and the urea functional groups as the pigment anchoring groups of this invention are far more effective for a wider range of pigment types.

Various modifications, alterations, additions or substitutions of the components of the compositions of this invention will be apparent to those skilled in the art without departing from the spirit and scope of this invention. This invention is not limited by the illustrative embodiments set forth herein, but rather is defined by the following claims.

What is claimed is:

1. A composition suitable for use as a pigment dispersant, comprising a graft copolymer having a polymeric backbone and macromonomer side chains attached to the backbone, wherein
   (1) the polymeric backbone consists essentially of polymerized ethylenically unsaturated monomers and
   (2) the side chains are macromonomers attached to the backbone at a single terminal point and consist essentially of polymerized ethylenically unsaturated monomers;
   wherein the graft copolymer has attached to either the backbone, the side chains or both, a urethane/urea group as the pigment anchoring group,
   wherein the urethane/urea group is formed by building hydroxyl functional groups into either the backbone, the side chains or both and then reacting the hydroxyl groups with a compound bearing at least two isocyanate groups, wherein at least one of the isocyanate groups is further reacted with ammonia or a primary or secondary amine containing compound.

2. The composition of claim 1 wherein the graft copolymer is formed mainly from polymerized acrylic and/or methacrylic monomers.

3. The composition of claim 1, wherein the pigment anchoring group is formed by copolymerizing ethylenically unsaturated hydroxyl functional monomers into either the backbone, the side chains, or both, and subsequently reacting the hydroxyl groups built into the copolymer with a polyisocyanate compound bearing at least two isocyanate groups and further reacting the polyisocyanate compound with ammonia or a primary or secondary amine containing compound.

4. The composition of claim 1 wherein the pigment anchoring group is formed by copolymerizing primary or secondary hydroxyl alkyl acrylate or methacrylate monomers or mixtures of them into either the backbone, the side chains, or both, and subsequently reacting the hydroxyl groups built into the copolymer with a diisocyanate and further reacting the diisocyanate with ammonia or a primary or secondary amine.

5. The composition of claim 1 wherein the primary and secondary amine used to form the pigment anchoring group is selected from the group consisting of aliphatic, aromatic, and heterocyclic group containing amines.

6. The composition of claim 1 wherein the graft copolymer comprises about 10–90% by weight of polymeric backbone and correspondingly about 90–10% by weight of macromonomer side chains.

7. The composition of claim 1 wherein the graft copolymer has a weight average molecular weight of about 3,000–150,000.

8. The composition of claim 1 wherein the anchoring groups are positioned on the backbone.

9. The composition of claim 1 wherein the anchoring groups are positioned on the side chains.

10. The composition of claim 3 wherein the hydroxyl functional monomers used to form the urethane/urea anchoring groups comprise at least about 1% by weight of the graft copolymer.

11. The composition of claim 1 wherein the graft copolymer further contains acyclic or cyclic amide groups as an additional anchoring group on the same segment(s) containing the urethane/urea anchoring group.

12. The composition of claim 11 wherein the additional anchoring group is vinyl pyrrolidinone.

13. The composition of claim 3 wherein the graft copolymer further contains unreacted hydroxyl groups on either or both the backbone or macromonomer.

14. A composition suitable for use as a pigment dispersant, comprising a graft copolymer, wherein the graft copolymer has a weight average molecular weight of about 3,000–150,000 and comprises about 10–90% by weight of a polymeric backbone and correspondingly about 90–10% by weight of macromonomer side chains attached to the backbone wherein (1) the polymeric backbone is formed from polymerized ethylenically unsaturated monomers and (2) the side chains are macromonomers are attached to the backbone at a single terminal point and are formed from polymerized ethylenically unsaturated monomers and have a weight average molecular weight of about 1,000–30,000;

wherein the graft copolymer contains about 2 to 70% by weight, based on the total weight of the graft copolymer, of polymerized ethylenically unsaturated monomers containing functional hydroxyl groups that are polymerized into the backbone, the side chains or both, wherein the hydroxyl groups of the copolymer are reacted with a compound bearing at least two isocyanate groups and the isocyanate compound is further reacted with ammonia or a compound bearing a primary or secondary amine to form at least one urea group on the graft copolymer attached through a urethane linkage.

15. The composition of claim 14 wherein said graft copolymer is formed mainly from polymerized methacrylic and/or acrylic monomers.

16. The composition of claim 15 wherein said graft copolymer further contains up to about 30% by weight, based on the total weight of the graft copolymer, of unreacted hydroxyl groups on either or both the backbone or macromonomer.

17. The composition of claim 16 wherein said graft copolymer further contains up to 20% by weight, based on the total weight of the graft copolymer, of acyclic or cyclic amide groups on the same segment(s) with the urethane/urea anchoring group.

18. The composition of claim 14 wherein the anchoring group is positioned on the backbone.

19. The composition of claim 14 wherein the anchoring group is positioned on the macromonomer side chains.

20. A pigment dispersion comprising a pigment in an organic solvent dispersed by means of a composition of claim 1 or 14.

21. A solvent based coating composition containing a pigment dispersion of claim 20.

22. A process for producing a pigment dispersant, comprising:

(a) polymerizing a macromonomer in the presence of a cobalt chain transfer agent such that said macromonomer contains one terminal ethylenically unsaturated group;

(b) grafting said macromonomer onto a polymeric backbone comprising ethylenically unsaturated monomers; and (c) adding a urethane/urea group to the graft copolymer by reacting hydroxyl functional groups built in the macromonomer, backbone, or both, in the presence of catalyst with a polyisocyanate compound bearing at least two isocyanate groups such that a urethane bond is formed between the graft copolymer and polyisocyanate and at least one isocyanate group on the polyisocyanate remains unreacted, and subsequently reacting substantially all remaining unreacted isocyanate groups with ammonia or a primary or secondary amine containing compound such that a urea functional group is formed as a pendant group thereon.

23. The process of claim 22 wherein the polymerization reactions are carried out in an organic solvent.

* * * * *